United States Patent [19]

Hosoda et al.

[11] Patent Number: 4,631,307

[45] Date of Patent: Dec. 23, 1986

[54] HEAT-RESISTANT HIGH IMPACT STYRENE RESIN, PROCESS FOR PRODUCTION THEREOF, AND RESIN COMPOSITION COMPRISING SAID STYRENE RESIN

[75] Inventors: Atsushi Hosoda; Yoshikiyo Miura, both of Chiba; Takehisa Mizuno; Tsuyoshi Morita, both of Ichihara, all of Japan

[73] Assignee: Dainippon Ink and Chemicals, Inc., Tokyo, Japan

[21] Appl. No.: 774,872

[22] Filed: Sep. 12, 1985

Related U.S. Application Data

[63] Continuation of Ser. No. 671,871, Nov. 15, 1984, abandoned.

[30] Foreign Application Priority Data

Nov. 15, 1983 [JP] Japan .................................. 58-213312
Feb. 29, 1984 [JP] Japan .................................. 59-38358

[51] Int. Cl.$^4$ ................................................ C08K 5/54
[52] U.S. Cl. ...................................... 524/269; 525/64; 525/301
[58] Field of Search ................... 524/269; 525/64, 301

[56] References Cited

U.S. PATENT DOCUMENTS

| | | | |
|---|---|---|---|
| 4,223,096 | 9/1980 | Lee | 525/78 |
| 4,331,784 | 5/1982 | Ishibashi | 525/301 |
| 4,456,733 | 6/1984 | Hornbaker | 525/301 |

*Primary Examiner*—Paul R. Michl
*Attorney, Agent, or Firm*—Sherman and Shalloway

[57] ABSTRACT

This invention provides a styrene copolymer resin having heat resistance and impact resistance. The resin is a moldable thermoplastic resin obtained by copolymerizing 3 to 70% by weight of a rubbery polymer and 97 to 30% by weight in total of styrene and methacrylic acid, provided that the proportions of styrene and methacrylic acid are 97 to 65% by weight and 3 to 35% by weight, respectively. The styrene and methacrylic acid are partly grafted to the rubbery polymer.

13 Claims, 2 Drawing Figures

HEAT-RESISTANT HIGH IMPACT STYRENE RESIN, PROCESS FOR PRODUCTION THEREOF, AND RESIN COMPOSITION COMPRISING SAID STYRENE RESIN

This application is a continuation of application Ser. No. 671,871 filed Nov. 15, 1984, now abandoned.

This invention relates to a novel and useful heat-resistant high impact styrene resin, a process for production thereof, and a resin composition comprising the styrene resin.

More specifically, this invention relates to a high impact styrene/methacrylic acid copolymer resin having excellent heat resistance and surface gloss prepared by copolymerizing a monomeric mixture composed essentially of styrene and methacrylic acid in the presence of a rubbery polymer to graft part of the monomers to the rubbery polymer, and to a process for production thereof. The invention also pertains to a resin composition comprising the rubber-modified styrene/methacrylic acid copolymer resin and an organopolysiloxane and having high heat resistance as well as impact strength while retaining various other properties such as surface gloss, moldability, tensile strength and flexural strength in a well balanced combination.

Generally, a polystyrene resin has been widely used as a molding material because of its excellent transparency, dimensional stability and moldability, but the lack of heat resistance and poor chemical resistance have been pointed out as the defects of the polystyrene resin when it is compared with various thermoplastic resins. In an attempt to remove these defects, a styrene/maleic anhydride copolymer resin (to be sometimes referred to as SMA resin hereinafter), and a styrene/acrylonitrile copolymer resin (to be sometimes referred to as AS resin hereinafter) have been proposed. In the case of the former, since the alternating copolymerizability of the two monomers is high, special devices and techniques are required in order to copolymerize a small amount of maleic anhydride randomly and thus to produce a resin suitable as a molding material. There is also a restriction on the production technique in that a polymerization method involving using an aqueous medium, for example a suspension polymerization method, cannot be employed. The latter has the defect of being insufficient in heat resistance and susceptible to coloration.

As a transparent resin which removes these defects of the prior art and has a combination of heat resistance and oil resistance, a styrene/methacrylic acid copolymer resin (to be sometimes referred to as SMAA resin hereinafter), and a resin composition based on the SMAA resin were proposed in Japanese Laid-Open Patent Publication No. 96641/1983. The SMAA resin can be highly evaluated as a heat-resistant molding material because it has a heat-resistant temperature 20° to 30° C. higher than the aforesaid polystyrene resin and better transparency. On the other hand, it has poor impact strength which restricts its range of application.

If, therefore, impact strength can be imparted to the SMAA resin while it retains its inherent properties, its application would evidently extend to fields requiring both heat resistance and impact strength, for example as automotive parts and accessories such as instrument panels, heater ducts and tail lamp housings; household electrical appliances such as air conditioner ducts, breaker covers, TV cabinets, hair curlers and electrical iron handles; office automation devices and related parts such as cassettes for VCR tapes, cassettes for audio tapes, floppy disc casings and housings of office automation devices; parts relating to optical and image-projecting devices such as camera housings, projector housings, and slide magazines; food packages and trays such as those adapted to be treated in an electronic range; and various thermal insulating materials for use in buildings, heaters and containers.

So far, no high impact styrene/methacrylic acid copolymer resin has been developed which has properties suitable for these various uses.

On the other hand, in order to improve the impact resistance of styrene resins, rubber-modified polystyrene resins containing rubbery polymers as dispersed particles have been produced in large quantities, and molded articles of such modified polystyrene resins have also been used widely. These rubber-modified polystyrene resins, however, have the defect of lacking heat resistance among various thermoplastic resins.

A rubber-modified styrene/maleic acid copolymer resin and a rubber-modified styrene/acrylonitrile copolymer resin have been provided to improve the heat resistance of rubber-modified polystyrene resin. These resins, however, have the same defects as the SMA resin and AS resin mentioned above. Specifically, in the case of the former, since the alternating copolymerizability of the two monomers is high, special devices and techniques are required in order to copolymerize a small amount of maleic anhydride randomly and thus to produce a resin suitable as a molding material. There is also a restriction on the production technique in that an emulsion polymerization method cannot be employed. The latter has the defect of being insufficient in heat resistance and susceptible to coloration.

Generally, the following methods are known for improving the moldability of a thermoplastic resin.

(1) A method in which the flowability and consequently the moldability of a copolymer resin are improved by lowering its molecular weight.

(2) A method in which the moldability of a copolymer resin is improved by mixing a low-molecular-weight compound as a plasticizing component with the copolymer resin.

(3) A method in which the moldability of a resin is improved by reducing the content of a rubbery polymer in the resin.

These methods, however, cannot be satisfactorily applied to a rubber-modified styrene/methacrylic acid copolymer resin. For example, according to the method (1), the mechanical strengths such as tensile strength of the resin is reduced as its molecular weight is lowered, and there is a limit on the degree of lowering the molecular weight. In the method (2), the lower softening point of the plasticizing component results in a reduction in heat resistance. If the method (3) is used, the reduction of the rubbery polymer content leads to a reduction in impact resistance which is one characteristics of the copolymer resin in question. For the foregoing reason, it is impossible to apply such prior art techniques to the rubber-modified styrene/methacrylic acid copolymer resin which is the basic component of the composition of the present invention.

If a method or a substance is found which does not reduce impact resistance even when the rubbery polymer content of the resin is reduced, the moldability of the resin would be improved, and it would be possible to expect molded articles of the resin which have improved surface gloss, mechanical strengths such as tensile strength and flexural strength, and surface hardness.

We have made extensive investigations in order to remove the various defects of the conventional resins described above, and found that a copolymer resin or a resin composition comprising the resin, which has a specific chemical composition, obtained by graft copolymerizing a vinyl monomer mixture composed essentially of styrene and methacrylic acid in the presence of a rubbery polymer, or melt-kneading the resulting graft copolymer and SMAA resin has strikingly improved impact strength while retaining its inherent heat resistance. We have also found that by adding a particularly limited amount of an organopolysiloxane to a rubber-modified styrene/methacrylic acid copolymer resin having a specific chemical composition, a product having markedly improved impact strength can be obtained without an adverse effect on its flowability. In other words, we have found that if an organopolysiloxane is used in designing a resin having a certain degree of impact strength, the amount of a rubbery polymer which is one of factors of reducing moldability and is an expensive reinforcing material can be reduced, and consequently, a resin having heat resistance, impact strength and moldability in a well balanced combination can be produced.

Thus, the present invention provides a moldable thermoplastic styrene copolymer resin obtained by copolymerizing a mixture composed of specific proportions of a rubbery polymer, styrene and methacrylic acid and as required another vinyl monomer copolymerizable with styrene and methacrylic acid, and a process for producing the copolymer resin.

Figure 1:
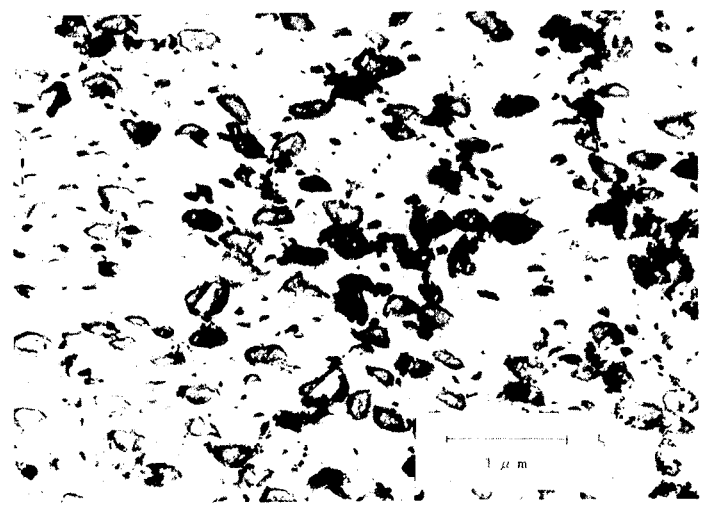
FIG. 1 is an electron microphotograph of an ultrathin section of a copolymer resin not containing an organopolysiloxane.

More specifically, this invention provides a process for producing a styrene copolymer resin, which comprises polymerizing 3 to 70% by weight of a rubbery polymer and 97 to 30% by weight in total of styrene and methacrylic acid and optionally another vinyl monomer copolymerizable with styrene and methacrylic acid, the proportions of styrene and methacrylic acid being 97 to 65% by weight and 3 to 35% by weight, respectively, and less than 50% by weight of styrene being replaceable with the other vinyl monomer, to perform grafting; and separating, washing, dehydrating and drying the resulting product.

The present invention also provides either a resin composition comprising a rubber-modified styrene/methacrylic acid copolymer resin containing a rubbery polymer as dispersed particles having an average particle diameter of 0.1 to 0.8 micrometer and 3 to 35% by weight of methacrylic acid, and 0.001 to 0.2% by weight, as silicon, of an organopolysiloxane or a mixture of a rubber-modified styrene/methacrylic acid copolymer resin containing a rubbery polymer as dispersed particles having 0.1 to 0.8 micrometer and a styrene/methacrylic acid copolymer resin which mixture contains 1 to 50% by weight of the rubbery polymer as dispersed particles and 3 to 35% by weight of methacrylic acid, and 0.001 to 0.2% by weight, as silicon, of an organopolysiloxane. The composition has high heat resistance and impact strength while retaining its various other properties such as moldability, surface gloss, tensile strength and flexural srength in a well balanced combination.

What is especially important in regard to the improvement of impact strength is firstly that the vinyl monomers consisting of styrene and methacrylic acid as essential ingredients are grafted to the rubbery polymer, and secondly that when the rubbery polymer is contained as dispersed particles having an average particle diameter of 0.1 to 0.8 micrometer, a small amount of the organopolysioxane is added as an aid for improving impact strength.

The necessity for the aforesaid grafting is evident from the fact that when, for example, "RYULEX A-15" (SMAA resin made by Dainippon Ink and Chemicals, Inc.) was melt kneaded with various diene-type rubbery polymers, an improvement in impact strength was scarcely observed in the resulting compositions. Specifically, when polybutadiene (BR), styrene/butadiene rubber (SBR) or acrylonitrile/butadiene rubber (NBR) was added to the SMAA resin, it only reduced the heat resistance of the resin, and an increase in impact strength was only very slight. For example, when SBR was added in an amount of 30% by weight to the SMAA resin, the resulting composition had an Izod impact strength (determined by ASTM D-256, notched, thickness $\frac{1}{4}$ inch) of only 3 kg-cm/cm, and lacked practical applicability. When attempts were made to melt-knead the SMAA resin with various impact-resistant resins such as high impact polystyrene resin (HIPS resin), acrylonitrile/butadiene rubber/styrene copolymer resin (ABS resin) or methyl methacrylate/butadiene rubber/styrene copolymer resin (MBS resin), they were not miscible with each other or had only insufficient compatibility, and therefore, a blend having excellent mechanical strength could not be obtained.

The resin of this invention is a graft copolymer obtained by using a rubbery polymer, styrene and methacrylic acid as essential materials, and particularly using 3 to 70% by weight of the rubbery polymer and 97 to 30% by weight in total of styrene and methacrylic acid. Styrene must be used in a proportion of 97 to 65% by weight, and methacrylic acid, in a proportion of 3 to 35% by weight, based on the sum of styrene and methacrylic acid. If required, less than 50% by weight, preferably 1 to 20% by weight, of the styrene may be replaced by another vinyl monomer copolymerizable with the styrene and methacrylic acid. The vinyl monomers should be grafted to the rubbery polymer, and the grafting ratio, or the percentage of the monomers grafted to the rubbery polymer, is preferably 3 to 300%. The grafting ratio is analyzed in accordance with the following method.

About one gram of the sample including R % of rubbery polymer is dissolved in 100 ml of a mixture of toluene and methanol in a volume ratio of 9:1. The insoluble matter is separated by an ultracentrifuge, dried and weighed.

Let the amounts of the sample and the insoluble matter be S grams and D grams, respectively, the grafting ratio is calculated from the following equation.

$$\text{Grafting ratio (\%)} = \frac{100 \times D - S \times R}{S \times R}.$$

The addition of the organopolysiloxane will now be described.

The heat-resistant high impact copolymer resin in accordance with this invention has improved impact strength with an increase in the amount of the rubbery polymer added, but it cannot be denied that this tends to reduce the flowability and therefore the moldability of the resin. We carried out investigations in order to increase the impact strength of the heat-resistant high impact styrene copolymer resin of this invention per rubbery polymer unit and thus to reduce the amount of the rubbery polymer and increase the flowability of the resin. These investigations have led to the discovery of the surprising fact that when an organopolysiloxane is added to a rubber-modified styrene methacrylic acid copolymer resin containing a grafted product of a rubbery polymer having an average particle diameter within the range of 0.1 to 0.8 micrometer, the impact strength of the resin is markedly improved without substantially changing the various properties of the resin such as flowability.

The effect of adding the organopolysiloxane in designing a resin having a fixed level of impact strength is that the amount of the rubbery polymer which is one factor of reducing moldability and is itself an expensive reinforcing material can be decreased, and consequently, a resin composition having a well balanced combination of heat resistance, impact strength and moldability can be produced economically.

By way of example, it has been ascertained that a mixture of 40 parts of a rubber-modified styrene/methacrylic acid copolymer resin containing 50% by weight of a rubbery polymer having an average particle diameter of 0.35 micrometer and 13% by weight of methacrylic acid and 60 parts by weight of a styrene/methacrylic acid copolymer resin has an Izod impact strength (notched; the same hereinafter) of 8.0 kg-cm/cm, but when 0.08% by weight (0.03% by weight as silica) of an organopolysiloxane is added to the resin, the Izod impact strength increases to 12.0 kg-cm/cm which is about 1.5 times as large.

It is not certain why the addition of the organopolysiloxane increases impact strength. One possibility is that by the presence of the organopolysiloxane, the styrene/methacrylic acid copolymer resin grafted to the rubbery polymer gains resistance to breakage during pelletization by an extruder or during injection molding.

This will be more specifically described below. A powdery graft copolymer obtained by graft-copolymerizing styrene and methacrylic acid with a rubbery polymer (latex) in emulsion, salting out the product, washing it and then drying it (namely a rubber-modified styrene/methacrylic acid copolymer resin), either as such or as a mixture with a separately prepared styrene/methacrylic acid copolymer resin, is kneaded in an extruder and pelletized, and the pellets are analyzed. Analysis of the pellets shows that the grafting ratio is low when no organopolysiloxane is added to the rubber-modified copolymer resin, whereas when the organopolysiloxane is added to the rubber-modified copolymer resin, the grafting ratio is high.

Figure 2:
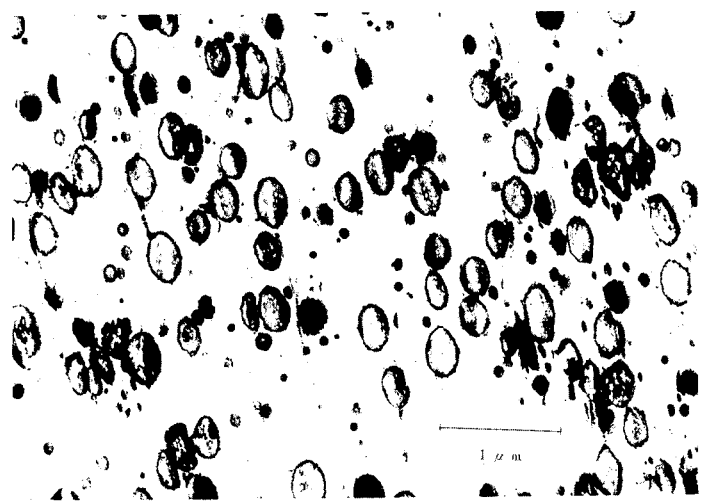
FIG. 2 is an electron microphotograph of an ultrathin section of a copolymer resin containing organopolysiloxane according to the present invention.

When the shapes of the dispersed particles of the rubbery polymer in the above two types of pellets are observed from an electron micrograph of their ultrathin section, a marked difference is found in the shape of rubber particles between the two. Specifically, when the copolymer resin does not contain the organopolysiloxane (see FIG. 1), the rubber phase is drastically deformed. It is believed that the styrene/methacrylic acid copolymer resin grafted to the rubbery polymer (rubber particles) and covering the surface of the rubbery polymer is peeled under a high shear within the extruder, and the protecting action on the rubber phase by grafting is lost. In contrast, when the copolymer contains the organopolysiloxane (FIG. 2), the rubber particles in the rubber phase are maintained spherical. This is presumably because the styrene/methacrylic acid copolymer resin covering the surface of the rubber particles is not peeled even under a high shear within the extruder, and the grafting ratio at the time of polymerization is retained, with the result that the compatibility of the rubber-modified resin with the styrene/methacrylic acid copolymer resin as a matrix polymer is good, and the impact strength can be improved.

It is especially important in this invention that the rubbery polymer in the form of dispersed particles should have an average particle diameter in the range of 0.1 to 0.8 micrometer. If the average particle diameter falls outside this range, the effect of adding the organopolysiloxane is unexpectedly not produced.

The fact that the effect of adding the organopolysiloxane can be produced only in the case of particle sizes with a relatively narrow range seems to be inherent to the rubber-modified styrene/methacrylic acid copolymer resin.

The average particle diameter of the dispersed particles of the rubbery polymer is calculated from the following equation after measuring the particle diameters of 200 to 500 rubbery polymer particles present in the visual field of the electron micrograph of the resin obtained by the ultrathin section method.

$$\text{Average particle diameter} = \Sigma n_i D_i^2 / \Sigma n_i D_i \quad [\text{I}]$$

wherein $D_i$ is a typical value of the ith class when the measured diameters are classed at 0.1 micrometer intervals and is an intermediate value between the upper and lower side's values which distinguish that class from other classes, and $n_i$ is the sum of rubbery polymer dispersed particles of the ith class.

Typical examples of the rubbery polymer are BR, SBR, NBR and ethylene/propylene/polyene rubber (EPDM). The suitable amount of the rubbery polymer is 3 to 70 parts by weight, preferably 3 to 50 parts by weight, when the total amount of the graft copolymer component is 100 parts by weight. If it is less than 3 parts by weight, an increase in impact strength is not observed virtually. If, on the other hand, it exceeds 70 parts by weight, the resulting resin becomes very difficult to mold.

When the average particle diameter of the rubbery polymer is within the range of 0.1 to 0.8 micrometer, the impact strength of the resulting product is improved effectively by incorporating a small limited amount of the organopolysiloxane. Hence, the amount of the rubbery polymer can be decreased to 1 to 50 parts by weight.

The suitable amount of methacrylic acid in the vinyl monomers is 3 to 35% by weight. If it is less than 3% by weight, an increase in heat resistance is difficult to expect. On the other hand, if it exceeds 35% by weight, the melt viscosity of the resulting resin becomes high, and its molding becomes difficult.

The suitable amount of styrene in the vinyl monomers is 97 to 65% by weight. Less than 50% by weight, preferably 1 to 20% by weight, of styrene may be replaced by another copolymerizable vinyl monomer.

Since the grafting ratio of the graft copolymer resin is an important factor with regard to impact strength, the suitable grafting ratio in this invention is 3 to 300% by weight, preferably 3 to 150%.

Typical examples of the other copolymerizable vinyl monomer include alpha-methylstyrene, t-butylstyrene, halogen-substituted styrene, vinyltoluene, (meth)acrylonitrile, alpha-chloroacrylonitrile and (meth)acrylic esters.

The organopolysiloxane to be added to increase effects on the impact strength of the rubber in the styrene/methacrylic acid copolymer resin in accordance with this invention denotes a polymer having structural units represented by the following general formula [II]

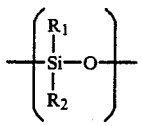

wherein $R_1$ and $R_2$ are identical or different and each represents an alkyl, aryl or aralkyl group, and may be a homopolymer-type organopolysiloxane composed of only one type of such a structural unit, or a copolymer-type organopolysiloxane of the random, block or graft type.

The organic groups in the above organopolysiloxane may be partly substituted by a hydroxyl group, an alkoxy group, a hydroxyalkyl group or a polyhydroxyalkylene group.

Needless to say, the various organopolysiloxanes above may be used as a mixture of two or more. Typical examples of the organopolysiloxane are dimethylpolysiloxane, methylphenylpolysiloxane, diphenylpolysiloxane and methylbenzylpolysiloxane. Diethylpolysiloxane is preferred. The organopolysiloxane used in this invention should have a boiling point of at least 120° C., and be thermally and chemically stable at temperatures used to mold the resin composition. Suitable organopolysiloxanes which meet these requirements are those having a viscosity of 10 to 100,000 centistokes, preferably 15 to 50,000 centistokes, especially preferably 100 to 10,000 centistokes.

The suitable amount of the organopolysiloxane used is 0.001 to 0.2% by weight, preferably 0.002 to 0.08% by weight, especially preferably 0.002 to 0.05% by weight, as silicon, based on the total amount of the rubber-modified styrene/methacrylic acid copolymer resin composition of this invention. If it is less than 0.001% by weight, the improving effect contemplated by this invention cannot be expected. If, on the other hand, it exceeds 0.2% by weight, the improving effect does not increase correspondingly, and rather causes a reduction in mechanical strengths such as tensile strength. Thus, amounts outside the specified range are objectionable.

The content of the organopolysiloxane as silicon can be determined from the amount of the organopolysiloxane added, or by atomic absorption spectrochemical analysis of the silicon atoms.

The organopolysiloxane may be added during the copolymerization of forming the rubber-modified styrene/methacrylic acid copolymer, or during pelletization in an extruder. When the rubber-modified styrene/methacrylic acid copolymer resin is to be blended with another resin, the organopolysiloxane may be included in advance in the other resin to be blended. Typical other blending resins include, for example, styrene resins such as polystyrene, styrene/acrylonitrile copolymer or styrene/methyl methacrylate copolymer, and various thermoplastic resins such as poly(methyl methacrylate), polycarbonate or polyphenylene oxide.

To prepare the desired resin by the process of this invention, graft polymerization methods for obtaining high impact resins which are generally known can be applied. Examples are as follows.

(1) A bulk polymerization method which comprises dissolving a rubbery polymer in vinyl monomers and polymerizing them at 60° to 150° C. in the presence or absence of an initiator.

(2) A solution polymerization method which follows the method (1) but in which a solvent is used in order to decrease the viscosity of the solution and to facilitate its stirring or the conveyance of the liquid polymer and the polymerization is carried out in a diluted system.

(3) A bulk-suspension polymerization method which comprises performing the polymerization partially in accordance with the method (1), and thereafter completing the polymerization in aqueous suspension.

(4) An emulsion polymerization method in which a rubber in the form of a latex is used as the rubbery polymer and the graft polymerization is carried out at 40° to 100° C. in the emulsified state in the presence of a peroxide as an initiator.

In order to obtain a resin having high impact strength and excellent quality, it is necessary to use a special version of the emulsion polymerization method (4).

The methods (1) to (4) can be applied to the production of the resin contemplated by this invention, but have some inconveniences. Specifically, the bulk polymerization method (1) and the solution polymerization method (2) are adapted for mass production and are carried out on a large scale at high investment costs. Furthermore, with these methods, the stirring or conveying of the polymerization mixture or product tends to become difficult as the rubber content increases. According to the bulk-suspension polymerization method (3), as the rubber concentration increases, the viscosity of the polymerization mixture increases and this is liable to cause troubles such as the agglomeration of the dispersed particles before the suspending step. Hence, the rubber content is usually limited to 8 to 10% by weight, and it is sometimes difficult to expect an improvement in properties and appearance, particularly high impact strength. According to the emulsion polymerization method (4), methacrylic acid causes coagulation or breaking of the latex, and the system becomes unstable during polymerization and may finally be agglomerated (this is due to the deactivation of the surface active agent used as an emulsifier in the latex, and this phenomenon is frequently observed in an emulsified system containing an acid group-containing monomer).

We have extensively worked in order to overcome these difficulties in the prior art, and have found that in the emulsion polymerization method, the method of adding methacrylic acid greatly affects the stability of the emulsified system and the properties of the resulting copolymer resin. Specifically, we have found that by continuously adding a part of methacrylic acid in the process of this invention as the polymerization proceeds, the agglomeration of the latex during the polymerization can be inhibited, and the copolymerization composition can be made uniform, and therefore that a resin having higher impact strength than a resin obtained by the batch in which the total amount of the monomers are added to the reactor before starting the copolymerization process can be obtained.

Such a special emulsion polymerization method makes it possible to produce a copolymer resin which contains as high as 70% by weight of rubber. Thus, the resulting resin has strikingly improved impact strength over those obtained by other methods and excellent surface gloss as well. Furthermore, when the high-impact resin produced by the specific emulsion polymerization method in the process of this invention is kneaded with a previously prepared SMAA resin, it is easy to adjust the impact strength, heat resistance and flowability of the resulting composition. Accordingly, this specific method additionally brings about the advantage that products can be designed according to the intended usages.

It will be apparent from the foregoing description that although the copolymer resin of this invention can be produced by using the methods (1) to (4), the aforesaid special emulsion polymerization method is especially suitable in order to obtain resins having excellent quality. By following the specific process of this invention, a copolymer resin can be obtained which will give molded articles having excellent impact strength, heat resistance and surface gloss, and therefore, high-grade molding materials comparable to conventional engineering plastics can be provided in the fields of electric appliances and precision machinery and appliances as well as automotive parts.

The emulsion polymerization method in this invention will now be described in detail. In the following description, a product obtained by graft emulsion polymerization of styrene and methacrylic acid in the presence of the rubbery polymer latex is referred to as a copolymer resin (A), and a styrene/methacrylic acid copolymer resin used to adjust impact strength suitably by melt kneading with the resin (A), as a copolymer (B).

The copolymer resin (A) is produced by emulsion polymerization of 3 to 70% by weight (as solids) of the rubbery polymer latex and 97 to 30% by weight in total of styrene and methacrylic acid (provided that styrene is used in a proportion of 97 to 65% by weight, and methacrylic acid, in a proportion of 3 to 35% by weight). But in performing the polymerization, all of the rubbery polymer, all of the styrene and 1 to 70% by weight of methacrylic acid are first fed into a reactor, and the remaining 99 to 30% by weight of methacrylic acid is continuously introduced into the reactor after the starting of the copolymerization before the polymerization conversion reaches 90%. The emulsion polymerization is carried out with stirring in the presence of an emulsifier and an initiator at a temperature of 40° to 100° C. and for 3 to 12 hours. Then, various inorganic salts such as calcium chloride, magnesium chloride, sodium chloride or sodium sulfate and/or various acidic substances such as hydrochloric acid, sulfuric acid or acetic acid are added to coagulate and precipitate the product. The coagulated product is collected by filtration, washed with water and dried to give the copolymer resin (A).

Needless to say, various known initiators, chain transfer agents and antioxidants may be used in the above process.

The type of the surface-active agent (emulsifier) used in the process is important to the stability of the emulsified system, and anionic surfactants of the sulfate type and sulfonate type are suitable. The use of metal salts of higher fatty acids which are usually employed in emulsion polymerization is not desirable since they break the emulsion system during polymerization.

As stated hereinabove, typical rubbery polymer latices used in this process are polybutadiene latex, SBR latex, NBR latex and EPDM latex. In view of the properties of the final product, rubber latices having a high gel content are preferred.

The amount of methacrylic acid in the vinyl monomers is a very important factor because it greatly affects the heat resistance of the final product. If it is less than 3% by weight, the effect of methacrylic acid cannot be produced sufficiently. If it exceeds 35% by weight, the emulsified system becomes unstable and coarse particles are liable to form by the breakage of the latex. Hence, amounts outside the specified range are not desirable.

In obtaining the copolymer (A), it is recommended to add methacrylic acid by a special method which comprises introducing 1 to 70% by weight, preferably 1 to 50% by weight, of methacrylic acid at the start of the reaction, and continuously adding the remainder (i.e. 99 to 30% by weight, preferably 99 to 50% by weight) of methacylic acid with the progress of the polymerization before the polymerization conversion reaches 90%.

When the amount of methacrylic acid to be fed before starting the polymerization is less than 1% by weight, a homopolymer of styrene tends to form during the early stage of the polymerization, and the properties of the final product tend to be deteriorated. If it exceeds 70% by weight, the emulsified system becomes undesirably unstable.

Furthermore, in this specific method, the addition of methacrylic acid is preferably effected at a time before the polymerization conversion reaches 90%. When it is added after the 90% conversion has been reached, methacrylic acid can no longer be substantially taken into the resulting copolymer resin.

The graft copolymer resin (A) so obtained is supplied in the form of a powder or pellets and used as a molding material.

The copolymer resin (B) can be obtained by heat polymerizing styrene and methacrylic acid in the presence or absence of a polymerization initiator as described, for example, in Japanese Laid-Open Patent Publication No. 96641/1983 cited hereinabove.

Heat-resistant high impact resins of various grades can be obtained by kneading the resulting resin (A) and the resin (B). The resins (A) and (B) may be kneaded in desired ratios. The preferred weight ratio of (A) to (B) is 20–70:80–30.

Kneading of the resins (A) and (B) is carried out in a customary manner by known conventional devices such as a two-roll mill, a Banbury mixer and an extruder.

Various additives normally used in styrene resins or rubber-nmodified styrene resins of the above types, such as plasticizers, heat, light or oxygen stabilizers, fire retardants, coloring agents, lubricants, mold releasing agents and antistatic agents may be added to the resulting resin composition of this invention.

The heat-resistant high impact styrene/methacrylic acid copolymer resin of this invention and the resin composition comprising the copolymer resin and the organopolysiloxane in accordance with this invention can be easily injection-molded, extruded or compression-molded by ordinary molding machines.

The following Referential Examples, Examples and Comparative Examples illustrate the present invention more specifically. All parts and percentages are by weight unless otherwise specified. The various properties were tested by the following methods.

Izod impact strength

Measured in accordance with ASTM D-265 using a ¼ inch thick notched test specimen at 23° C.

Heat distortion temperature

Measured in accordance with ASTM D-648 under a maximum fiber stress of 18.6 kg/cm².

Surface gloss

In accordance with JIS Z-8741, the specular gloss at an incident angle of 60 degrees was measured.

Melt flow rate

Measured in accordance with ASTM D-1238 under condition I.

Yield strength

Measured in accordance with ASTM D-638.

Flexural strength

Measured in accordance with ASTM D-790.

REFERENTIAL EXAMPLE 1

Preparation of SMAA resin:

A 5-liter autoclave equipped with a stirrer was charged with 200 parts of distilled water, and 0.005 part of sodium dodecylbenzenesulfonate and 0.5 part of partially saponified polyvinyl alcohol as a suspension stabilizer were added and dissolved. Then, the autoclave was successively charged with 85 parts of styrene, 15 parts of methacrylic acid, 0.05 part of tertiary dodecyl mercaptan, 0.2 part of di-tert.butyl peroxyhexahydroterephthalate and 0.1 part of tert.butyl perbenzoate. With stirring at a speed of 400 rpm, the temperature was raised to 85° C., and the monomers were suspension-polymerized for 10 hours. Then, the reaction was further carried out at 120° C. for 3 hours.

The resulting granular SMAA resin was washed, dehydrated and dried.

REFERENTIAL EXAMPLE 2

Preparation of a styrene/methyl methacrylate/methacrylic acid copolymer resin:

The same reactor as used in Referential Example 1 was charged with 200 parts of distilled water, and 0.005 part of sodium dodecylbenzenesulfonate and 1 part of partially saponified polyvinyl alcohol as a suspension stabilizer were added and dissolved. Then, the autoclave was successively charged with 65 parts of styrene, 20 parts of methyl methacrylate, 15 parts of methacrylic acid, 0.7 part of benzoyl peroxide, 0.1 part of tert.butyl perbenzoate and 0.05 part of tert.dodecyl mercaptan, and with stirring at a speed of 400 rpm, the temperature was raised to 80° C. The monomers were suspension polymerized for 10 hours at this temperature, and the reaction was further carried out at 120° C. for 3 hours.

The resulting granular styrene/methyl methacrylate/methacrylic acid copolymer resin was washed, dehydrated and dried.

EXAMPLE 1

The same reactor as used in Referential Example 1 was charged with the following materials.

| | |
|---|---|
| Polybutadiene latex (solid rubber content = 57.4%) | 52 parts |
| Styrene | 60 parts |
| Methacrylic acid | 3 parts |
| Potassium persulfate | 0.3 parts |
| tert.Dodecyl mercaptan | 0.15 parts |
| Sodium dodecylbenzenesulfonate | 2 parts |
| Distilled water | 200 parts |

Nitrogen gas was introduced into the reactor, and with stirring, the temperature was raised to 70° C. After this temperature was reached, 7 parts of methacrylic acid was continuously added over the course of 3 hours. The emulsion polymerization was carried out at this temperature for 2 hours.

To the resulting latex was added a 10% aqueous solution of calcium chloride in an amount of 2.5% based on the solids content of the latex, and with stirring, the latex was coagulated at a temperature of 90° to 110° C. The coagulated product was then collected by filtration, washed with water, dehydrated, and dried to obtain a powdery graft copolymer resin.

Then, 0.2 part of "Irganox 1076" (an antioxidant made by Ciba-Geigy, West Germany) was added to the copolymer resin, and the mixture was pelletized by an extruder at a cylinder temperature of 230° C.

The pellets were then injection-molded and the properties of the molded specimen were evaluated.

The results are summarized in Table 1.

EXAMPLE 2

A graft copolymer resin was produced in the same way as in Example 1 except that the starting materials were changed as follows:

| | |
|---|---|
| Polybutadiene latex (same as in Example 1) | 52 parts |
| Styrene | 50 parts |
| Methacrylic acid (*) | 10 parts |
| Methyl methacrylate | 10 parts |
| Potassium persulfate | 0.3 parts |
| tert.Dodecylmercaptan | 0.15 parts |
| Sodium dodecylbenzenesulfonate | 2 parts |
| Distilled water | 200 parts |

(*): Three parts of methacrylic acid was charged initially, and the remaining 7 parts, added continuously as the polymerization proceeded.

After charging the reactor with these materials, the same operation as in Example 1 was carried out, and the properties of the resulting resin were evaluated.

The results are summarized in Table 1.

EXAMPLE 3

The same reactor as used in Referential Example 1 was charged with the following materials.

| | |
|---|---|
| Styrene | 82 parts |
| Methacrylic acid | 10 parts |
| Polybutadiene rubber | 8 parts |
| tert.Dodecylmercaptan | 0.08 parts |

They were thoroughly dissolved at 60° C., and the inside of the reactor was purged with nitrogen gas. With stirring, the monomers were polymerized in bulk for 4 hours while the temperature of the inside of the reactor was maintained at 110° C. The reaction mixture was cooled to 70° C., and 0.2 part of di-tert.butyl peroxyhexahydroterephthlate and 0.05 part of tert.butyl perbenzoate were added and dissolved.

Then, an aqueous solution composed of 0.5 part of partially saponified polyvinyl alcohol, 0.005 part of sodium dodecylbenzenesulfonate and 100 parts of distilled water was added to the polymerization system with stirring to suspend the bulk polymerization product. The temperature of the system was raised to 90° C., and the suspension polymerization was carried out for 8 hours. Then the reaction was further carried out at 120° C. for 3 hours.

The resulting copolymer resin beads were washed, dehydrated, dried, pelletized and injection-molded in the same way as in Example 1, and the properties of the molded specimen were evaluated.

The results are summarized in Table 1.

EXAMPLE 4

This Example illustrates a blend of a graft copolymer resin and SMAA resin.

A graft copolymer was prepared in the same way as in Example 1 except that the amounts of the polybutadiene latex and styrene were changed to 87 parts and 40 parts, respectively.

Sixty parts of the graft copolymer resin was mixed with 40 parts of SMAA resin and 0.2 part of "Irganox 1076", and the mixture was pelletized in an extruder at a cylinder temperature of 230° C. The pellets were then injection-molded, and the properties of the molded specimen were evaluated. The results are summarized in Table 2.

EXAMPLE 5

Forty parts of the same graft copolymer resin as obtained in Example 4 and 60 parts of SMAA resin were used. Otherwise, in the same way as in Example 4, pelietization and injection molding were carried out, and the properties of the molded specimen were evaluated.

The results are summarized in Table 2.

EXAMPLE 6

The amounts of the graft copolymer resin and the SMAA rsin were changed to 20 parts and 80 parts, respectively. Otherwise, in the same way as in Example 4, pelletization and injection molding were carried out, and the properties of the molded specimen were evaluated.

The results are summarized in Table 2.

COMPARATIVE EXAMPLE 1

The same SMAA resin as obtained in Referential Example 1 was used instead of the grafted copolymer. Otherwise, in the same way as in Example 1, pelletization and injection molding were carried out, and the properties of the molded specimen were evaluated.

The results were summarized in Table 1.

COMPARATIVE EXAMPLE 2

Seventy parts of the same SMAA resin as obtained in Referential Example 1, 30 parts of "ASAFLEX" (SBR made by Asahi Chemical Industry Co., Ltd.) and 0.2 part of "Irganox 1076" were mixed, and the mixture was pelletized in an extruder at a cylinder temperature of 230° C.

The pellets were then injection-molded, and the properties of the molded specimen were evaluated.

The results are summarized in Table 2.

It is particularly noteworthy that the molded specimen had an Izod impact strength of 3.0 kg-cm/cm.

EXAMPLE 7

The same reactor as used in Referential Example 1 was charged with the following materials.

| | |
|---|---|
| Polybutadiene latex (solid rubber content 52%) | 96.2 parts |
| Styrene | 40 parts |
| Methacrylic acid | 3 parts |
| Potassium persulfate | 0.2 parts |
| tert.Dodecylmercaptan | 0.008 parts |
| Sodium dodecylbenzenesulfonate | 0.8 parts |
| Distilled water | 200 parts |

Nitrogen gas was introduced into the reactor, and with stirring, the temperature was raised to 70° C. When this temperature was reached, 7 parts of methacrylic acid was continuously added over the course of 3 hours. Further, the emulsion polymerization was carried out at the same temperature for 2 hours.

To the resulting copolymer latex was added a 10% aqueous solution of calcium chloride in an amount corresponding to 2.5% of the solids of the latex. With stirring, the latex was coagulated at a temperature in the range of 110° to 130° C. The coagulated product was collected by filtration, washed with water, dehydrated and dried to obtain a powdery graft copolymer resin.

Forty parts of the graft copolymer resin was mixed with 60 parts of the SMAA resin obtained in Referential Example 1 and 0.2 part of "Irganox 1076", and the mixture was pelletized by an extruder at a cylinder temperature of 230° C.

The pellets were injection-molded, and the properties of the molded specimen were evaluated. The results are summarized in Table 3.

The molded specimen had an Izod impact strength of 8.0 kg-cm/cm.

The amount of the rubbery polymer in the resulting resin composition was 20%, and the rubbery polymer had an average particle diameter of 0.35 micrometer.

EXAMPLE 8

A molded specimen was prepared in the same way as in Example 7 except that before pelletization in an extruder, 0.08 part of "TORAY SILICONE SH-200" (an organopolysiloxane made by Toray Silicone Co., Ltd.) was added to the mixture.

The properties of the molded specimen were evaluated, and the results are summarized in Table 3.

As shown in Table 3, the resin composition had a silicon content of 0.03%, and the molded specimen had an Izod impact strength of 12.7 kg-cm/cm.

EXAMPLE 9

SMAA resin was prepared in the same way as in Referential Example 1 except that 0.2 part of "TORAY SILICONE SH-200" was added at the time of feeding styrene. A molded specimen was prepared in the same way as in Example 8 except that 60 parts of the SMAA resin and 40 parts of the same graft copolymer resin as obtained in Example 7 were mixed without the addition of "TORAY SILICONE SH-200".

The properties of the molded specimen were evaluated, and the results are summarized in Table 3.

The resulting resin composition had a silicon content of 0.045%, and the rubbery polymer in it had an average particle diameter of 0.35 micrometer.

The Izod impact strength of the molded specimen was 12.1 kg-cm/cm.

EXAMPLE 10

A graft copolymer resin was prepared in the same way as in Example 7 except that 0.2 part of "TORAY SILICONE SH-200" was added at the time of feeding styrene. A molded specimen was prepared in the same way as in Example 8 except that 40 parts of the resulting graft copolymer resin and 60 parts of the same SMAA resin as obtained in Referential Example 1 were mixed without the addition of "TORAY SILICONE SH-200".

The properties of the molded specimen were evaluated, and the results are summarized in Table 3.

The resulting resin composition had a silicon content of 0.03%, and the rubbery polymer in the composition had an average particle diameter of 0.35 micrometer.

The Izod impact strength of the molded specimen was 11.9 kg-cm/cm.

EXAMPLE 11

A molded specimen was prepared in the same way as in Example 7 except that the amounts of the SMAA resin and the graft copolymer resin were changed to 40 parts and 60 parts, respectively.

The properties of the molded specimen were evaluated, and the results are summarized in Table 3.

As shown in Table 3, the Izod impact strength of the molded specimen was 12.5 kg-cm/cm.

EXAMPLE 12

A powdery graft copolymer resin was prepared in the same way as in Example 7 except that at the time of feeding styrene, 10 parts of the entire styrene (40 parts) was replaced by methyl methacrylate.

Forty parts of the graft copolymer resin was mixed with 60 parts of the styrene/methyl methacrylate/methacrylic acid copolymer resin obtained in Referential Example 2, and the mixture was pelletized in an extruder at a cylinder temperature of 230° C.

The pellets were then injection-molded, and the properties of the molded specimen were evaluated. The results are summarized in Table 3.

The rubbery polymer in the resulting resin composition had an average particle diameter of 0.35 micrometer, and the molded specimen had an Izod impact strength of 8.1 kg-cm/cm.

EXAMPLE 13

A molded specimen was prepared in the same way as in Example 12 except that before pelletization in the extruder, 0.08 part of "TORAY SILICONE SH-200" was added.

The properties of the molded specimen were evaluated, and the results are summarized in Table 3.

The resulting resin composition had a silicon content of 0.03%. The Izod impact strength of the molded specimen was 15 kg-cm/cm.

EXAMPLE 14

A molded specimen was prepared in the same way as in Example 8 except that 2.0 parts of a mineral oil was added at the time of feeding styrene.

The properties of the molded specimen were evaluated, and the results are summarized in Table 3.

COMPARATIVE EXAMPLE 3

This example shows that the addition of an organopolysiloxane in an amount exceeding 0.2% as silicon does not give a corresponding increase in effect.

A molded specimen as a control was prepared in the same way as in Example 8 except that before pelletization in the extruder, 0.8 part of "TORAY SILICONE SH-200" was added.

The properties of the molded specimen were evaluated, and the results are summarized in Table 3.

As shown in Table 3, the resulting resin composition had a silicon content of 0.3%, and the Izod impact strength of the molded specimen was 12.1 kg-cm/cm.

TABLE 1

|  | Example 1 | Example 2 | Example 3 | Comparative Example 1 |
|---|---|---|---|---|
| Synthesis method | Emulsion polymerization | Emulsion polymerization | Bulk-emulsion polymerization | Suspension polymerization |
| Polymer composition (parts) | | | | |
| Styrene | 60 | 50 | 82 | 85 |
| Methacrylic acid | 10 | 10 | 10 | 15 |
| Methyl methacrylate | | 10 | | |
| Rubbery polymer | 30 | 30 | 8 | — |
| Izod impact strength (kg-cm/cm) | 12.5 | 13.5 | 7.4 | 1.2 |
| Heat distortion temperature (°C.) | 105 | 103 | 100 | 110 |
| Surface gloss | 93 | 89 | 62 | — |
| Grafting ratio (%) | 45 | 48 | 150 | — |

TABLE 2

|  | Example 4 | Example 5 | Example 6 | Comparative Example 2 |
|---|---|---|---|---|
| Blending composition (parts) | | | | |
| Graft copolymer resin | 20 | 40 | 60 | — |
| SMAA resin | 80 | 60 | 40 | 70 |
| "ASAFLEX 810" | — | — | — | 30 |
| Composition of the blend (parts) | | | | |
| Styrene | 76 | 67 | 58 | 60 |
| Methacrylic acid | 14 | 13 | 12 | 10 |
| Rubbery polymer | 10 | 20 | 30 | 30 |
| Izod impact strength (kg-cm/cm) | 5.5 | 8.0 | 12.5 | 3.0 |
| Heat distortion temperature (°C.) | 110 | 108 | 105 | 105 |
| Surface gloss | 91 | 88 | 87 | 75 |

TABLE 3

| | Example | | | | | | | | Comparative Example |
|---|---|---|---|---|---|---|---|---|---|
| | 7 | 8 | 9 | 10 | 11 | 12 | 13 | 14 | 3 |
| Contents of main components in the composition (%) | | | | | | | | | |
| Methacrylic acid | 13 | 13 | 13 | 13 | 12 | 13 | 13 | 13 | 13 |
| Methyl methacrylate | | | | | | 16 | 16 | | |
| Silicon | | 0.03 | 0.045 | 0.03 | | | 0.03 | 0.03 | 0.3 |
| Rubbery polymer | 20 | 20 | 20 | 20 | 30 | 20 | 20 | 20 | 20 |
| Average particle diameter of the rubbery polymer | | | | | 0.35 | | | | 0.35 |
| Properties | | | | | | | | | |
| Izod impact strength (kg-cm/cm) | 8.0 | 12.7 | 12.1 | 11.9 | 12.5 | 8.1 | 15 | 13.5 | 12.1 |
| Melt flow rate (g/10 min.) | 0.22 | 0.21 | 0.20 | 0.20 | 0.03 | 0.80 | 0.80 | 0.22 | 0.21 |
| Heat distortion temperature (°C.) | 108 | 108 | 108 | 108 | 103 | 101 | 100 | 107 | 108 |
| Yield strength (kg/cm$^2$) | 463 | 412 | 440 | 445 | 370 | 420 | 412 | 400 | 400 |
| Flexural strength (kg/cm$^2$) | 542 | 512 | 530 | 537 | 385 | 505 | 500 | 500 | 500 |

What is claimed is:

1. A moldable, thermoplastic rubber-modified styrene copolymer resin composition having heat resistance and impact strength, said composition comprising (1) a mixture composed of (i) a rubber-modified styrene copolymer resin obtained by copolymerizing 3 to 70% by weight of a rubbery polymer and 97 to 30% by weight in total of styrene, methacrylic acid and optionally another vinyl monomer copolymerizable with styrene and methacrylic acid, the proportions of styrene, methacrylic acid and the optional other vinyl monomer being 3 to 35% by weight of methacrylic acid and correspondingly from 97 to 65% by weight in total of styrene and the optional other vinyl monomer with the proviso that when a mixture of both styrene and the other vinyl monomer is used more than 50% by weight of the mixture is styrene, said styrene, methacrylic acid and the optional other vinyl monomer being partly grafted to the rubbery polymer, and (ii) a styrene/methacrylic acid copolymer resin composed of 97 to 65% by weight of styrene or a mixture of styrene and another vinyl monomer copolymerizable with styrene and methacrylic acid with the proviso that when said mixture is used the majority of said mixture is comprised of styrene, and 3 to 35% by weight of methacrylic acid, said composition containing 1 to 50% by weight of the rubbery polymer as dispersed particles having an average particle diameter of 0.1 to 0.8 micrometer, and 3 to 35% by weight of the methacrylic acid, and (2) 0.001 to 0.2% by weight, as silicon, of an organopolysiloxane.

2. The resin composition of claim 1 wherein the grafting ratio of styrene, methacrylic acid and the optional other vinyl monomer grafted to the rubbery copolymer is 3 to 300%.

3. The resin composition of claim 1 wherein the rubber-modified styrene copolymer resin is obtained by emulsion polymerization of styrene and methacrylic acid in the presence of a polybutadiene latex.

4. The resin composition of claim 1 wherein the rubber-modified styrene copolymer resin is obtained by emulsion polymerization of styrene and methacrylic acid in the presence of a styrene/butadiene copolymer latex containing at least 60% by weight of butadiene.

5. The resin composition of claim 1 wherein the rubber-modified styrene copolymer resin (i) is obtained by copolymerizing 3 to 70% by weight of the rubbery polymer and 97 to 30% by weight in total of styrene, methacrylic acid, and another vinyl monomer copolymerizable with styrene and methacrylic acid, the proportions of styrene, methacrylic acid and the other vinyl monomer being 3 to 35% by weight of methacrylic acid and correspondingly from 97 to 65% by weight in total of styrene and the other vinyl monomer with the other vinyl monomer constituting from 1 to 20% by weight of the weight of styrene.

6. The resin composition of claim 5 wherein the other copolymerizable vinyl monomer is selected from the group consisting of alpha-methylstyrene, t-butylstyrene, halogen-substituted styrene, vinyltoluene, acrylonitrile, methacrylonitrile, alpha-chloroacrylonitrile, acrylic esters and methacrylic esters.

7. The resin composition of claim 1 wherein the organopolysiloxane (2) comprises a polymer having structural units represented by the following formula (III):

$$\left(\begin{array}{c} R_1 \\ | \\ -Si-O- \\ | \\ R_2 \end{array}\right) \quad (II)$$

wherein $R_1$ and $R_2$ are identical or different and represent alkyl, aryl or aralkyl groups, which may be substituted by hydroxyl, alkoxy, hydroxyalkyl or polyhydroxyalkylene groups.

8. The resin composition of claim 7 wherein the organopolysiloxane comprises dimethylpolysiloxane, methylphenylpolysiloxane diphenylpolysiloxane, methylbenzylpolysiloxane or mixtures thereof.

9. The resin composition of claim 7 wherein the organopolysiloxane has a viscosity of from 15 to 50,000 centistokes.

10. The resin composition of claim 1 which comprises from 0.002 to 0.8% by weight, as silicon, of said organopolysiloxane.

11. The resin composition of claim 1 which comprises 0.002 to 0.05% by weight, as silicon, of said organopolysiloxane.

12. The resin composition of claim 1 wherein the rubbery polymer of the rubber-modified styrene copolymer resin is selected from the group consisting of polybutadiene rubber, styrene/butadiene rubber, acrylonitrile/butadiene rubber, and ethylene/propylene/polyene rubber.

13. The resin composition of claim 1 wherein the weight ratio of the rubber-modified styrene copolymer resin (i) to the styrene/methacrylic acid copolymer resin (ii) in the mixture (1) is from 20:80 to 70:30.

* * * * *